Feb. 2, 1965    A. L. MOORE ETAL    3,168,682
SUPERVISORY SYSTEM
Filed Feb. 10, 1961
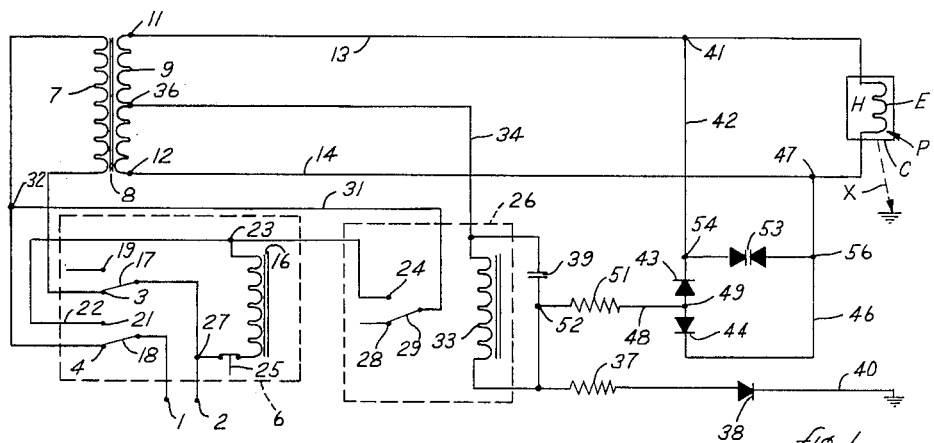
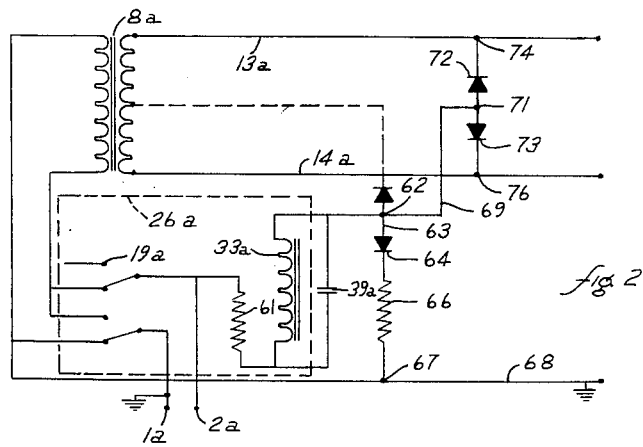
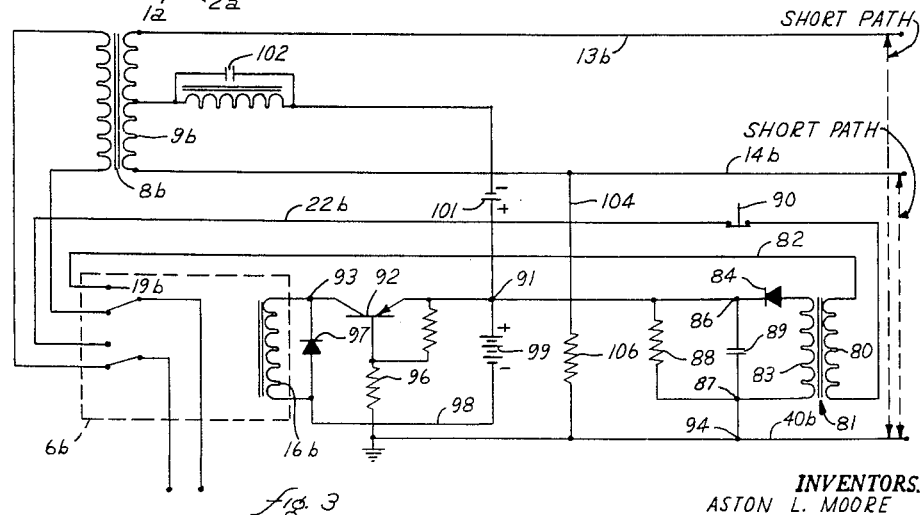
INVENTORS.
ASTON L. MOORE
CHARLES R. MOORE
BY
Woodhams Blanchard and Flynn
ATTORNEYS

United States Patent Office 3,168,682
Patented Feb. 2, 1965

3,168,682
SUPERVISORY SYSTEM
Aston L. Moore and Charles R. Moore, both of 220 Hammond Place, South Bend, Ind.
Filed Feb. 10, 1961, Ser. No. 88,489
8 Claims. (Cl. 317—18)

This invention relates to a supervisory system and it relates particularly to a type thereof applicable to domestic or mobile home use for turning off the electric power supply upon the appearance of a short circuit between a load circuit associated with said electric power supply and a return path, such as the frame of the mobile home or a ground path.

While the circuit giving rise to the present invention has been developed as a supervisory and protective system for mobile home use, the principles embodied therein are of wide applicability and accordingly the use of a mobile home protective circuit in the description hereinafter following will be understood as only for illustrative purposes and not as limiting.

In the customary supply of alternating potential to a residence, especially a mobile home, for the usual domestic uses, it has long been recognized that leakage will sometimes develop in the insulation utilized in power consuming devices, such as domestic appliances, such that the person using such appliances may receive a shock therefrom. Particularly, it has long been recognized that if a person is well grounded, such as by being in contact with a plumbing fixture or the frame of a mobile home, such a shock as may be received from a stove, electric light fixture, heater or other electricity utilizing device may be of such magnitude as to cause serious injury or even death. While fuses and circuit breakers are capable of protecting an electrical system against extreme overloads, including those due to short circuits, they are not capable for well understood reasons of protecting persons utilizing equipment as above described from injury in a manner above described.

It is accordingly among the objects of the invention:

(1) To provide a supervisory circuit which will give a desired signal upon the appearance of a minute current in a suitable sensing device.

(2) To provide apparatus, as aforesaid, particularly adapted for disconnecting power supply to a circuit upon the connection of an undesired leakage therein to a return circuit.

(3) To provide apparatus, as aforesaid, which will disconnect the power supply to a residence upon the connection of a leakage therein to a return circuit through the body of a person.

(4) To provide apparatus, as aforesaid, which will be isolated from the normal fuse or circuit-breaker apparatus utilized so as to have no effect on the operation thereof.

(5) To provide apparatus, as aforesaid, whose power requirements will be sufficiently small as to be negligible.

(6) To provide circuitry, as aforesaid, which may be readily adapted to the giving of a variety of desired signals either in addition to or in place of the disconnecting of the power supply as above mentioned.

(7) To provide apparatus, as aforesaid, which can be adapted for the detection of other instances of current leakage, either in addition to or instead of shorting of a potential through the body of a person as above set forth.

(8) To provide apparatus, as aforesaid, which is of extreme simplicity and accordingly may be both provided and maintained in good operating condition at a minimum of cost.

(9) To provide a device, as aforesaid, having a high degree of reliability.

Other objects and purposes of the invention will be apparent to persons acquainted with apparatus of this general type upon reading the following description and inspecting the accompanying drawing.

In the drawing:

FIGURE 1 shows a schematic diagram of a circuit embodying the invention.

FIGURE 2 shows a fragment of the circuitry of FIGURE 1 and illustrates a modification.

FIGURE 3 shows a fragment of the circuitry of FIGURE 1 and illustrates another modification.

General description

In general, our invention consists of providing a relay circuit capable on being energized of disconnecting normally closed contacts in the power supply of the circuit with which the protective system is being used. To accomplish this, power is first drawn from said circuit for maintaining a suitable energizing means for said relay circuit preferably energized to a value just below that required for activating said relay circuit. Second circuitry is provided between a sensing circuit and a return path by which a potential is supplied to said sensing circuit upon the appearance of a triggering potential by which said apparatus is intended to operate, such as the presence of a person's body connecting an area of electrical leakage, such as a domestic appliance whose insulation has broken down, with the return path. Such additional potential is applied to the sensing apparatus and functions to complete its energization and the consequent energization of the relay circuit above mentioned and the disconnecting of the power supply.

Detailed description

Referring now to FIGURE 1 of the drawing, there are shown terminals 1 and 2 which are connected to any suitable source of supply. Said terminals are then connected through one pair of contacts 3 and 4 of a relay 6 to a primary winding 7 of a supply transformer 8. Said transformer 8 may be any supply transformer for the system in question and may particularly be either the pole transformer associated with a dwelling or a mobile home or it may, and more probably will, be an isolation transformer used adjacent to or within the residence or mobile home.

The secondary winding 9 of said transformer is connected through its terminals 11 and 12 to the output lines 13 and 14 which are connected to whatever load circuitry is to be energized by said transformer, such as the load circuitry within a dwelling. For illustrative purposes, said load may be a heater H having a heating element E therein whose insulation may be assumed to have broken down and which thereby has a conductive path P to the casing C of the heater.

Returning now to the apparatus of the invention, there is provided a relay winding 16 for operating in the usual manner the relay armatures 17 and 18 which armatures connect simultaneously with the contacts 3 and 4 in one position of said armatures and the contacts 19 and 21 in the other position of said armatures. The contact 19 is isolated from connection to anything and the contact 21 is connected through a conductor 22 to a junction point 23 and thence to the contact 24 of a second relay 26, said second relay being a highly sensitive relay. The winding 16 of the relay 6 is connected at its one end to the junction point 23 and at its other end through a normally closed reset switch 25 to the input terminal 2.

Returning now to the relay 26, the other contact 28 is isolated and the armature 29 thereof is connected by a conductor 31 to a junction point 32 on the one of said conductors connected to the terminal 1. The winding 33 of said relay 26 is connected at one end by a conductor 34 to a center tap 36 on the secondary winding 9 and is connected at its other end through a protective resistance 37 and a rectifier 38 to any suitable return path connection, such as to a water pipe in a house installation, or to the frame in a mobile home installation. The rectifier 38 is sensed with its anode connected to the relay winding 33. A capacitor 39 is connected around the relay winding 33 to prevent operation thereof by minor transients which might appear in the circuit and to smooth out the rectified D.C. potential applied to said winding 33 as hereinafter described.

A junction point 41 on the conductor 13 is connected by a further conductor 42 to the cathode side of a rectifier 43 whose anode side is connected to the anode of the further rectifier 44. The cathode side of said last-named rectifier is then connected by a conductor 46 to a junction point 47 located on the conductor 14. A conductor 48 is connected from a point 49 between said rectifiers 43 and 44 through a resistance 51 to a junction point 52, said last-named junction point being connected to a point between the relay winding 33 and the resistance 37. A surge suppressor is provided by a pair of rectifiers 53 having in this embodiment their cathodes connected together whose anodes are respectively connected to junction points 54 and 56 located on the conductors 42 and 46, respectively.

*Operation*

The operation of the apparatus will be readily understood. In its "at rest" condition, namely, when there is no conductive path between the casing C of the heater H contained in the above-suggested example, and the return path, the armatures 17 and 18 of the power relay 6 will lie against the contacts 3 and 4 and provide normal connection between the source terminals 1 and 2 and the primary winding 7 of said transformer 8 and thereby supply power to the secondary lines 13 and 14. Simultaneously, current will flow from the center tap 36 of the secondary winding 9 through the conductor 34, thence through the winding 33 of the sensitive relay 26 to the junction point 52, thence through the resistance 51, to the junction point 49. From said junction point 49 it will then flow, depending upon the polarity of said current, either through the conductor 46 to the secondary line 14 or through the conductor 42 to the secondary line 13. The value of the resistance 51, however, together with resistance in winding 33 itself, is such that the current flowing through said winding 33 is insufficient to activate the armature 29, although the magnitude of the current flowing through the winding 33 is held as high as possible without actually moving said armature 29.

With the energizing circuit for the winding of the power relay 6 broken at the contacts of the sensing relay 26, for so long as the armature 29 remains against the contact 28, the relay 6 will be de-energized and its armatures 17, 18 will remain against contacts 3 and 4.

Assume now that something happens at "X" to connect the casing C to the return path, such as by a person touching said heater while in contact with a return path connection, such as a water pipe or the frame of a mobile home. This provides a path from the center tap 36 of the secondary winding 9 to the winding of the sensitive relay 26, through the resistance 37 and the rectifier 38 to such water pipe or frame, thence through the defective heater H to either or both of the output lines 13 and 14. With the rectifier 38 sensed in the same manner as the rectifiers 43 and 44, namely, in this instance with its anode connected to the winding of the relay 26, an incipient current will start to flow through said path. Immediately upon the occurrence of such current in the winding of the relay 26, said relay will be sufficiently further energized to move its armature 29 against the contact 24. This makes a connection from one supply line at the junction 32 to the junction point 23 and thence through the winding of the power relay 6 to the junction point 27 on the other supply line, thereby energizing said relay 6 and moving the armatures thereof into contact with the contacts 19 and 21.

This will break the supply to the primary winding of the transformer 8, thereby de-energizing the entire system and thereby preventing harm to the person by whom the contact was made at X. Simultaneously, the connecting of the armature 18 with the contact 21 locks in the relay 6 to hold same in its energized condition until proper corrective action can be taken to repair or disconnect the area in which the short circuit is occurring. The normally closed reset switch 25 may then be momentarily opened to de-energize the winding 16 and permit the system to return to its "at rest" condition as above described.

The surge suppressor 53 is provided to absorb the counter E.M.F. developed between the lines 13 and 14 when the transformer 8 is de-energized by the opening of the relay 6.

While it is preferable as shown herein to place the contacts of the power relay 6 on the primary side of a supply transformer where such is convenient and such a transformer is available, it will be recognized that this is solely a matter of convenience. The invention will work equally well if for any reason it is necessary to place the contacts of the power relay 6 on the secondary side of said transformer, although in such case it may be necessary to provide suitable means for the prevention of excessive arcing at such contacts.

FIGURE 2 shows a modification requiring somewhat fewer components than the circuit of FIGURE 1 but following the same broad principles.

Here, the high voltage side 2a of the supply line is connected through a current limiting resistance 61 to the winding 33a of the relay 26a, thence to a junction point 62. From said junction point a branch 63 leads through a rectifier 64 and a current limiting resistance 66 to a further junction point 67 on a ground connected line 68. Another branch 69 leads from the junction point 62 to a further junction point 71 and thence through the rectifiers 72 and 73 to junction points 74 and 76 on the lines 13a and 14a.

In normal "at rest" condition, current from the high potential source 2a travels through the protective resistance 61 and through the winding 33a of the relay 26a, thence to the junction point 62 and by way of the first above-mentioned branch, back to the junction point 67 and to ground, which is connected to the side 1a of the source by virtue of the grounding of said side 1a. This holds a partial energization on the relay winding 33a but not sufficient to actuate said relay. A current path is also provided from the junction point 62 to the junction point 71 and thence to either of the lines 13a or 14a. When either of them is grounded in any manner, the path is then completed from the junction point 71 to the grounded terminal 1a of the power source and this permits sufficient further energization of the relay winding 33a to actuate said relay. Actuation of said relay shifts the connections from the position shown in FIGURE 2 and de-energizes the transformer 8a in the same manner as set forth above. However, in this instance, the relay 26a will remain energized for so long as the short path exists and it will hence be impossible to re-energize the transformer 8a until the short path is removed.

A still further system appears in FIGURE 3, which again utilizes the same broad principles but applies same by a different specific circuit including an electric valve, in this case a transistor, in place of the relay 26 shown in FIGURE 1.

Here again parts corresponding to the parts shown in FIGURE 1 are identified by the same numerals as those utilized in FIGURE 1 with the subscript "b" so that only the portions which differ from FIGURE 1 will require specific description. Here the line 22b is connected to one side of the primary winding 80 of a transformer 81 and the other side of said primary winding is connected by a line 82 to the contact 19b. The secondary winding 83 has its one end connected through a rectifier 84 to a junction point 86 and its other end connected to a junction point 87. The junction points 86 and 87 are connected through a resistance 88 and also are connected by a capacitor 89. Thus, an upward position of the contacts of relay 6b will effect energization of the transformer 81 and charging of the capacitor 89.

The junction point 86 is connected to a further junction point 91 which is connected to the emitter of a transistor 92, whose collector is connected through a junction point 93 to one end of the relay winding 16b. The junction point 87 is connected to a junction point 94 on the ground line 40b and thence through a resistor 96 to the base of the transistor 92. The other end of the relay winding 16b is connected through a rectifier 97 to the junction point 93 and is also connected by a line 98 to the negative end of a battery 99, here one of 25 volts, whose positive end is connected to the junction point 91. Said junction point 91 is also connected to the positive end of a relatively small battery 101, in the present example the same being 1½ volts, whose negative end is connected to one end of a tuned circuit 102, whose other end is connected to the center tap of the secondary winding 9b. Said tuned circuit 102 is provided for preventing passage therethrough of alternating pulses of the frequency appearing in the secondary winding 9b. If desired for extreme sensitivity of operation, a further connection 104 may be provided from the line 14b through a suitable and relatively large resistor 106 to the ground line 40b.

In the at-rest position, that is with no shorting between either of the lines 13b or 14b and the ground line 40b, the relay 16b is in the position shown in the drawing and an emitter-to-collector potential is applied by the battery 99 to the transistor electrodes. If the connection 104 is used, then there is a slight potential applied from the battery 101 through the choke 102 to the line 14b, thence by the line 104 to the line 40b, and thence through the resistance 96 to the base of the transistor, thence to the junction point 91, and back to the positive side of the battery 101. This will provide a slight conductivity between the collector and emitter of said transistor and a slight energization of the winding 16b from and by the battery 99. However, the resistance 106 is maintained at a sufficiently large magnitude that the energization of the winding 16b is insufficient to actuate the relay. However, upon the occurrence of a short between either of the lines 13b and 14b and the line 40b, then the conductive path for the small battery 101 is improved and the transistor is rendered more conductive, thereby applying more of the potential from the battery 99 to the winding 16b and actuating relay. Upon actuation of the relay, the transformer 8b is de-energized and the lines 13b and 14b are de-energized in the same manner as described above in connection with the circuit of FIGURE 1. However, in this instance, the relay is now energized, which brings its armature against the contacts 19b and 21b, thereby to energize the transformer 81, whose secondary acts through the rectifier 84 to charge the capacitor 89. The potential from said capacitor is applied to the base-emitter circuit of the transistor 92, thus holding it conductive between its emitter-collector electrodes even after removal of the short path between the line 40b and either of the lines 13b or 14b. In this way, the battery 99 is enabled to hold the relay 16b in its upper position until definite steps are taken to reset the protective system, such as by opening the switch 90. This will prevent any possibility of a person receiving repeated shocks from a defective appliance by touching same a second time until the system is deliberately restored to its normal condition.

While the current sources 101 and 99 have been shown as batteries, and such will be convenient and satisfactory in a circuit of the type described, it will be recognized that these may be any other forms of constant voltage which may be convenient under any given circumstances, such as suitably charged capacitors.

Although the above-mentioned drawings and description refer to certain and preferred embodiments of the invention, it is not our intention, implied or otherwise, to eliminate other modifications or variations of the invention unless specifically stated to the contrary in the hereinafter appended claims.

What is claimed is:

1. An automatic protective circuit for de-energizing an electric power circuit upon the appearance of a leakage therefrom to a return path, comprising in combination:
   first electrically emergizable means for de-energizing said power circuit upon energization of said first electrically energizable means;
   a circuit including second electrically energizable means adapted for energizing said first electrically enerigizable means when said second electrically energizable means is energized;
   continuously energized initial energizing means connected to partially energize said second electrically energizable means, said initial energizing means being regulated so as to provide energization of said second electrically energizable means of a magnitude less than that required to effect a response thereby, said initial energizing means including first circuitry comprising first rectifying means connecting said power circuit to said second electrically energizable means so that current flows through said second electrically energizable means in only one direction;
   second circuitry including second rectifying means connecting said second electrically enerizable means to said return path, said second rectifying means being so sensed with respect to said first rectifying means as to provide an arithmetical addition of the currents supplied thereby to said second electrically energizable means;
   whereby an electrically conductive path appearing between said power circuit and said return path will effect further energization of said second energizable means which in turn will effect energization of said first electrically energizable means and result in opening of said power circuit.

2. An automatic protective circuit for de-energizing an electric power circuit upon the appearance of a leakage therefrom to a return path, said power circuit including a transformer, the secondary winding of said transformer having a center tap and two output terminals, comprising:
   a power relay having an energizing winding and having contacts in series with said power circuit for de-energizing said power circuit when said winding of said power relay is energized;
   a sensing relay having an energizing winding and having contact means in series with said power relay winding whereby said power relay can be energized in response to energization of said sensing relay winding;
   a conductor connecting one end of said sensing relay winding to said center tap;
   a pair of rectifiers whose anodes are connected to the other end of said sensing relay winding and whose cathodes are connected respectively to said output terminals;
   means including a third rectifier connecting the other end of said sensing relay winding to ground, the anode of said third rectifier being connected to the other end of said sensing relay winding and the cathode thereof being connected to ground.

3. An automatic protective circuit for de-energizing an electric power circuit upon the appearance of a leakage therefrom to a return path, said power circuit including a pair of input terminals and a transformer, said transformer having a primary winding and a secondary winding, said secondary winding having two output terminals, comprising:
   a relay having an energizing winding and having contacts connected between said input terminals and the primary winding of said transformer, one end of said energizing winding being connected to one of said input terminals and the other of said input terminals being connected to ground;

a circuit including a first rectifier connected between the other end of said energizing winding and ground, the anode of said first rectifier being connected to said other end of said energizing winding and the cathode thereof being connected to ground;

a pair of rectifiers whose cathodes are connected respectively to said output terminals of said secondary winding and whose anodes are connected to said other end of said energizing winding.

4. An automatic protective circuit for de-energizing an electric power circuit upon the appearance of a leakage therefrom to a return path, said power circuit including a transformer, the secondary winding of the transformer having a center tap and two output terminals, comprising:

a power relay having an energizing winding and having contacts in series with said power circuit for de-energizing said power circuit when said winding of said power relay is energized;

a first source of constant potential;

an electric valve one of whose principal electrodes is connected to one side of said first source, the other principal electrode of said valve being connected to one end of said energizing winding and the other end of said energizing winding being connected to the other side of said first source, the control electrode of said valve being connected to ground;

a second source of constant potential having one side thereof connected to one of said principal electrodes and having its other side connected to said center tap whereby when one of said output terminals is connected to ground, the potential supplied by said second source will be effective to cause energizing of said winding.

5. An automatic circuit according to claim 4, including means responsive to energizing of said winding for supplying a further potential corresponding to that of said second source between said control electrode and said one principal electrode.

6. The circuit defined in claim 1 wherein said first and second rectifying means are similarly sensed and said first rectifying means is arranged to supply to said second electrically energizable means a current of magnitude less than that required to effect actuation of same and said second rectifying means is sensed similarly to said first rectifying means whereby current flowing through said return path circuit will increase the current supplied to said second energizable means sufficiently to effect actuation of said second energizable means.

7. In a supervisory circuit for a power circuit including a transformer, the combination comprising:

a power relay having its contacts in series relationship with said power circuit;

a sensing relay having its contacts in series with the winding of said power relay and means for energizing the winding of said power relay through the contacts of said sensing relay;

a center tap on the secondary winding of said transformer and means connecting same to one end of the winding of said sensing relay, a pair of oppositely connected rectifiers and means connecting a point intermediate said rectifiers to the other end of said sensing relay winding, and means connecting the respectively opposite ends of said rectifiers to the opposite ends of said secondary winding of said transformer; and means connecting said other end of said sensing relay winding to ground, said last-named means including a third rectifier sensed with respect to said sensing relay winding similarly to said pair of rectifiers.

8. A protective circuit for de-energizing a power circuit upon the appearance of a leakage therefrom to a return path, comprising in combination:

a switch in said power circuit and electrically energizable means for disconnecting said switch for de-energizing said power circuit upon the energization of said electrically energizable means;

means comprising a parallel circuit connected in parallel with said power circuit and energizable thereby for energizing said electrically energizable means and resistance means in said parallel circuit so that said electrically energizable means is energized only to a magnitude less than that capable of actuating said switch;

further circuitry providing an incomplete path from at least one side of said power circuit through said electrically energizable means and including said return path, said one side of said power circuit being otherwise free of connection to said return path, whereby leakage from said one side of said power circuit to said return path will complete said incomplete path, further energize said electrically energizable means and actuate said switch to de-energize said power circuit.

References Cited in the file of this patent

UNITED STATES PATENTS 2,987,654     Voss _____ June 6, 1961

FOREIGN PATENTS 90,742     Netherlands _____ Apr. 15, 1959
679,789     Great Britain _____ Sept. 24, 1952